(No Model.)

A. C. WHITE.
EYEGLASS CASE OR HOLDER.

No. 536,557. Patented Mar. 26, 1895.

WITNESSES
Leona C. Ams
B. W. Wentworth

INVENTOR
Arthur C. White.
Per Edwin W. Brown.
Attorney.

UNITED STATES PATENT OFFICE.

ARTHUR C. WHITE, OF QUINCY, MASSACHUSETTS.

EYEGLASS CASE OR HOLDER.

SPECIFICATION forming part of Letters Patent No. 536,557, dated March 26, 1895.

Application filed June 30, 1894. Serial No. 516,232. (No model.)

*To all whom it may concern:*

Be it known that I, ARTHUR C. WHITE, of Quincy, in the county of Norfolk and State of Massachusetts, have invented certain new and useful Improvements in Eyeglass Cases or Holders, of which the following is a full, clear, and exact description.

This invention relates to cases or holders for eyeglasses more particularly intended for offset eyeglasses so called, in which the portion of the eyeglass frame that grasps the nose of the person is offset or at an angle to the main frame, and the invention consists of an eyeglass case or holder having a plate or tongue piece secured by one end to the inside of the case or holder, its other end being free and arranged to hold the eyeglass between it and the case or holder preventing its accidental detachment therefrom, all substantially as hereinafter fully described reference being had to the accompanying sheet of drawings in which is illustrated an eyeglass case having this invention applied thereto.

Figure 1:
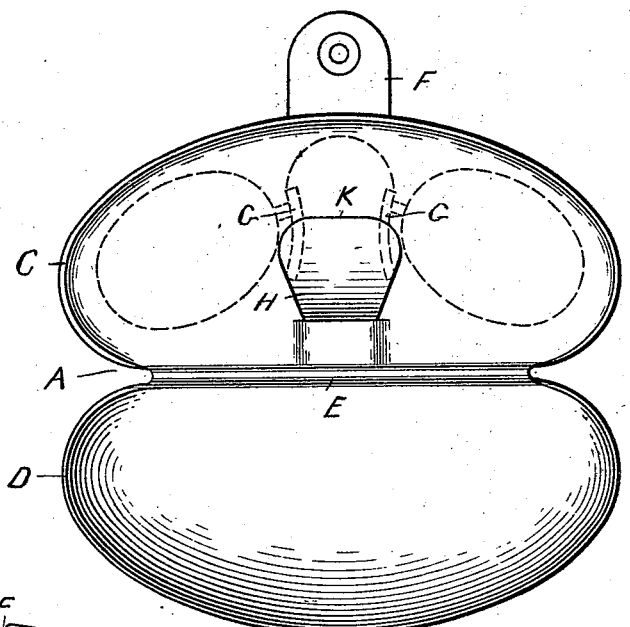
Figure 2:
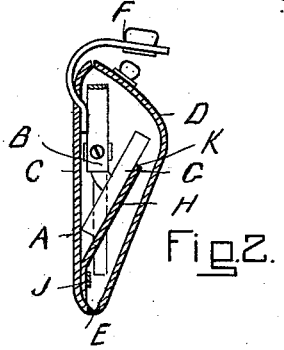
Figure 4:
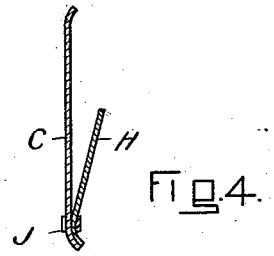
Figure 3:
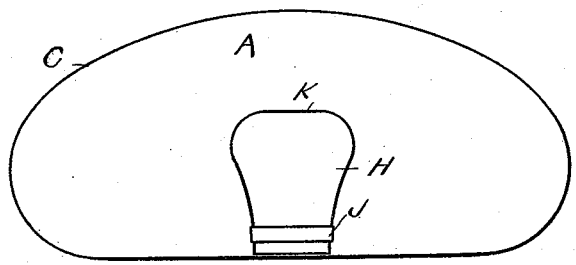

Figure 1 represents in plan view the eyeglass case as open with an eyeglass secured in place; Fig. 2, a central cross section of the case in its closed position. Fig. 3 is a plan view of one part of the case detached. Fig. 4 is a cross section on line 4—4 Fig. 3.

In the drawings A represents an eyeglass case of a size to hold the eyeglasses B, made in two parts C and D, hinged together at E, and having a clasp F opposite thereto by which the case when closed can be locked.

The part C of the case is substantially flat and the part D, is centrally raised to allow for the thickness or offset portion G of the eyeglass frame, the two parts being made of rigid material and covered or lined with leather or plush or any suitable material, all of which is substantially as usual in such eyeglass cases and needing no more particular description herein.

H is a thin plate or tongue piece of sheet metal, preferably of spring metal, and it is secured by one end to the inside of the part C near its hinge by a clasp J the ends of which pass through the thickness of the part C and are firmly bent down and secured on the other side which securely holds the tongue piece in place. This piece is preferably bent outwardly to leave its free end K a short distance from its part or holder, and when the case is opened the eyeglasses are placed on the part C, its offset or nose portion of the frame being inserted between the free end K of the tongue piece and the holder and then pressed down until the eyeglass frame is within the edges L of the part or holder C as shown in Fig. 1. In such movement the tongue piece is pressed outward more or less against the spring of the metal, and when in place its pressure on the eyeglasses holds them securely in place, so they will not be accidentally detached when the case is opened. This pressure of the tongue piece however is not sufficient to prevent the comparatively easy removal of the eyeglasses from the case by hand when desired.

When in place the lid or other part D of the case is closed upon the glasses and secured by the clasp F.

Although it is preferable to have the tongue piece made of spring metal, it need not be, as it can be made of a thin sheet of steel or suitable metal and when so made there will be more or less spring in the metal itself to serve the purpose.

The tongue piece can be secured in the manner shown or by a rivet or in any suitable manner, and it should preferably be bent outward, when made and applied, sufficiently for the easy entrance of the eyeglass frame between it and the case or holder, but not so far but that it will be bent somewhat farther when the eyeglasses are pressed into place, so that it will then bear with more or less pressure on the glasses to firmly hold them in place. This plate or tongue piece should preferably be wide enough to bear upon both portions of the nose piece of the eyeglasses the better to hold the glasses in place. It also can be applied to any suitable holder for the eyeglass other than the one herein particularly described and shown. After the tongue piece is secured the case can be covered with the leather or plush as desired, or the tongue piece can be secured after the case is finished, in any suitable manner.

Having thus described my invention, what I claim is—

In an eyeglass case, the combination of two members hinged together, one of which is swelled, as shown, the fastening device for retaining such members in close position, and a tongue secured at its lower end, to one of said members, its upper end extending away from said member and adapted to receive the nose-piece of the eye-glass frame to retain said frame in position in the case, substantially as described.

In testimony whereof I have hereunto set my hand in the presence of two subscribing witnesses.

ARTHUR C. WHITE.

Witnesses:
M. L. COOLEY,
FRANK LEONARD.